UNITED STATES PATENT OFFICE.

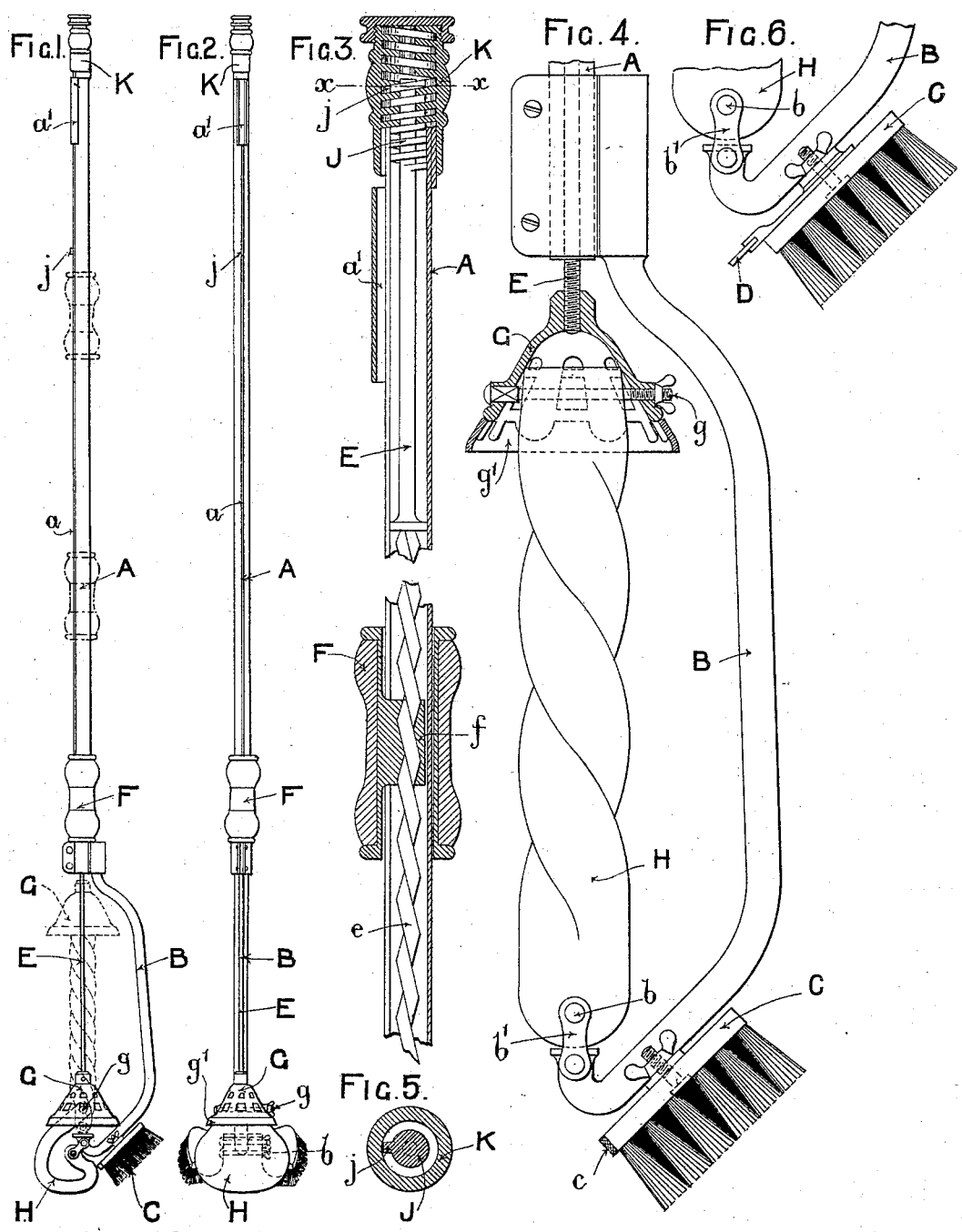

JAMES EDWIN GEE, OF WEST CROYDON, ENGLAND.

APPARATUS FOR WASHING, SCRUBBING, AND CLEANSING FLOORS.

SPECIFICATION forming part of Letters Patent No. 695,043, dated March 11, 1902.

Application filed July 26, 1901. Serial No. 69,838. (No model.)

*To all whom it may concern:*

Be it known that I, JAMES EDWIN GEE, a subject of the King of Great Britain and Ireland, residing at 55 St. Saviour's road, West Croydon, in the county of Surrey, England, have invented a new and useful Apparatus for Washing, Scrubbing, and Cleansing Floors, (for which I have applied for Letters Patent in Great Britain, No. 4, bearing date the 1st of January, 1901,) of which the following is a full and complete specification.

This invention relates to an improved apparatus for washing, scrubbing, and cleansing floors, the object being to provide an apparatus by means of which the user can scrub a floor without kneeling and also swab up and collect the slop and dirt into a bucket or other receptacle, leaving the floor in a condition in which it can be left to dry in the usual manner, the essential feature of the invention being a device for effectually wringing out the swab.

I am aware that swabs have already been used in combination with scrubbing-brushes mounted on long handles, the swab being adapted to be rotated with respect to the handle for the purpose of swinging it out; but this article has not proved useful, owing to the fact that the swab could not be so effectually wrung out with it.

According to this invention I attach one end of the swab to a bracket carried by the end of the handle carrying the scrubbing-brush, and I attach its other end to a bar passing up through the hollow handle, the said bar carrying or being formed with a quick-pitched multiple screw-thread, similar to an Archimedean drill, to which motion is imparted by a traveling nut, the arrangement being such that the first longitudinal movement of the nut with respect to the handle stretches the swab, while the continued movement both twists it and slightly elongates it, thus producing a most effective wringing action.

In the accompanying drawings, which illustrate this invention and form part of this specification, Figures 1 and 2 are views in elevation of the apparatus from different points of view. Fig. 3 is a broken view in section, on an enlarged scale, showing the operative part of the apparatus. Fig. 4 is a broken view, on a similar scale, showing the brush and the swab; and Fig. 5 is a view in transverse section on line $x\ x$, Fig. 3. Fig. 6 is a broken detail view of a modification.

Similar letters refer to similar parts throughout the several views.

This apparatus consists, essentially, of a tubular handle A of any suitable length, to the lower end of which is attached a suitably-shaped bracket B, to which is attached at its lower end a scrubbing-brush C, the said brush being fixed to the bracket by thumb-screws or their equivalent, so that it can be readily removed or replaced. In addition to the scrubbing-brush C a squeegee D (see Fig. 6) may also be detachably mounted on the bracket B.

Within the hollow handle A is a longitudinally-arranged bar E, having a quick-pitched multiple screw-thread, similar to that of an Archimedean drill, $e$ cut or formed on a suitable portion of its length. On the exterior of the tubular handle A is mounted a sliding sleeve F, carrying a nut $f$, engaging the screw-thread $e$, the said nut passing through and being guided by a longitudinal slot $a$ in the said handle. The lower end of the rod E carries a cup-shaped bracket G, to which one end of the swab H is attached in any convenient manner, the other end of the swab being attached to the lower end of the bracket B by a pin $b$, carried by a pair of shackle-links $b'$, attached to the bracket B, or by any suitable device which will allow the swab to adapt itself to be used as such and at the same time prevent its rotation with respect to its point of attachment. The object of the cup-shaped bracket is to prevent the swab gathering up when in use.

On the upper end of the rod E is a screw-thread J, which is adapted to engage with a corresponding thread in a cap K, adapted to be permanently fixed to the top of the tubular handle A. On the thread J is formed or fixed a projecting tongue $j$, which is adapted to engage both with the slot $a$ in the tubular handle A and with the female thread in the cap K, the said thread being made of increased depth for the purpose, as shown by Figs. 3 and 5.

The upper end of the slot $a$ in the tubular handle A below the cap K is preferably covered by a guard or shield piece, such as $a'$, to keep the hand of the user, who when using the apparatus will grip the pole at the top with one hand, clear of the projecting tongue $j$ on the thread J when it is traveling up the slot $a$ in the tubular handle A.

In use the swab H is in the position shown by Figs. 1 and 2, the apparatus being turned as it is desired to use the scrubbing-brush or the swab or the squeegee. When it is desired to wring out the swab, the sliding sleeve F is pulled upward, which thereby stretches and straightens the swab. A further movement of the sliding sleeve F causes the projection $j$ on the thread J to leave the slot $a$ in the tubular handle A and engage the female thread of the cap K, the effect of which is to cause the sliding sleeve F to impart a rotary motion to the rod E by means of its screw-threaded part $e$, which both twists the swab H and at the same time slightly further stretches it, due to the travel of the screw J in the thread of the cap K, thereby producing the most effective wringing action.

To prevent damage to the floor, I face the lower edge of the back of the brush with a strip $c$ of rubber when the squeegee D (see Fig. 6) is not employed, and to the same end I face the lower edge of the cup-shaped bracket G with rubber or other soft material $g'$.

What I claim, and desire to secure by Letters Patent, is—

1. In an apparatus for washing, scrubbing and cleansing floors, the combination with a hollow handle, a bracket attached to said handle carrying a scrubbing-brush, of a swab attached at one end to the bracket, of a rod located in the hollow handle and to which the other end of the swab is attached carrying or having a quick-pitched multiple screw-thread for a portion of its length and a screw-thread at its upper end, of a sliding nut engaging the said quick-pitched multiple-threaded screw, of a sleeve sliding longitudinally on the hollow handle and connected to the said nut, of a cap on the upper end of the hollow handle in which is a screw-thread with which the screw on the top of the internal rod engages, and of a projection on the said screw which engages the longitudinally-arranged slot in the hollow handle and with the female thread in the cap on the upper end of the said hollow handle, as set forth.

2. In an apparatus for washing, scrubbing and cleansing floors the combination with a hollow handle, a bracket attached to said handle carrying a scrubbing-brush, of a swab attached at one end to the bracket, of a cup-shaped holder to which the other end of the swab is attached, of a rod located in the hollow handle on which the cup-shaped holder is attached the said rod carrying or having a quick-pitched multiple screw-thread for a portion of its length and a screw-thread at its upper end, of a sliding nut engaging the said quick-pitched multiple-threaded screw, of a sleeve sliding longitudinally on the hollow handle and connected to the said nut, of a cap on the upper end of the hollow handle in which is a screw-thread with which the screw on the top of the internal rod engages, and of a projection on the said screw which engages the longitudinally-arranged slot in the hollow handle and with the female thread in the cap on the upper end of the said hollow handle, as set forth.

3. In an apparatus for washing, scrubbing and cleansing floors comprising a scrubbing-brush and a swab, a rod for manipulating the swab to which first a plain longitudinal stretching movement and secondly a combined twisting and further longitudinal stretching movement are imparted by one continuous movement of a sleeve sliding longitudinally on the hollow handle carrying the brush, as and for the purpose set forth.

Dated this 16th day of July, 1901.

JAMES EDWIN GEE.

Witnesses:
 ROBERT E. PHILLIPS,
 A. KNIGHTBROAD.